United States Patent
Tamura et al.

[11] Patent Number: 6,115,105
[45] Date of Patent: Sep. 5, 2000

[54] MICROFILM SEARCH DEVICE AND METHOD

[75] Inventors: Hiroshi Tamura; Makoto Saotome, both of Kanagawa, Japan

[73] Assignee: Fuji Photo Film Co., Ltd., Kanagawa, Japan

[21] Appl. No.: 09/190,446

[22] Filed: Nov. 13, 1998

[30] Foreign Application Priority Data

Nov. 13, 1997 [JP] Japan ..................................... 9-327224
Nov. 13, 1997 [JP] Japan ..................................... 9-327225

[51] Int. Cl.⁷ .......................... G03B 27/52; G03B 23/02; G03B 23/12
[52] U.S. Cl. ............................ 355/40; 353/25; 353/26 A
[58] Field of Search ............................ 355/27–29, 40–41; 353/25, 25 A, 26 A, 26 R, 27 A, 27 R, 107, 108; 358/403, 405, 451, 453; 250/559.01, 559.02–559.04, 560

[56] References Cited

U.S. PATENT DOCUMENTS

| | | | |
|---|---|---|---|
| 5,354,994 | 10/1994 | Hicks | 250/561 |
| 5,416,605 | 5/1995 | Hideshima et al. | 358/451 |
| 5,532,773 | 7/1996 | Shaw et al. | 353/26 A |
| 5,590,941 | 1/1997 | Hidesima | 353/26 A |
| 5,690,406 | 11/1997 | Furukawa et al. | 353/25 |
| 5,758,939 | 6/1998 | Ochiai et al. | 353/25 |

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

There is disclosed a microfilm search device which detects a frame or between-frames dimension from a density change in the running direction of a microfilm to determine the presence of frames and search for a desired frame. The detected density change is binarized to determine the dimension of the frame or between-frames. When detecting the length of a portion where the binarized signal representing film transparent portion continues, the dimension is corrected short. When detecting the length of a portion where the binarized signal representing film non-transparent portion continues, the dimension is corrected long. The frame or between-frames dimension can be detected with high accuracy to enhance the frame searching accuracy. Moreover, pulse signals outputted from an encoder are counted by a counter to monitor the film feeding amount, and the counter is reset when frames are detected and when the film feeding direction is reversed. Even if the film feeding direction is reversed during the scanning of a null transparent area in the frame by the density sensor, the null area is prevented from being incorrectly detected as an area between frames, and the presence of frames can correctly be determined.

7 Claims, 9 Drawing Sheets

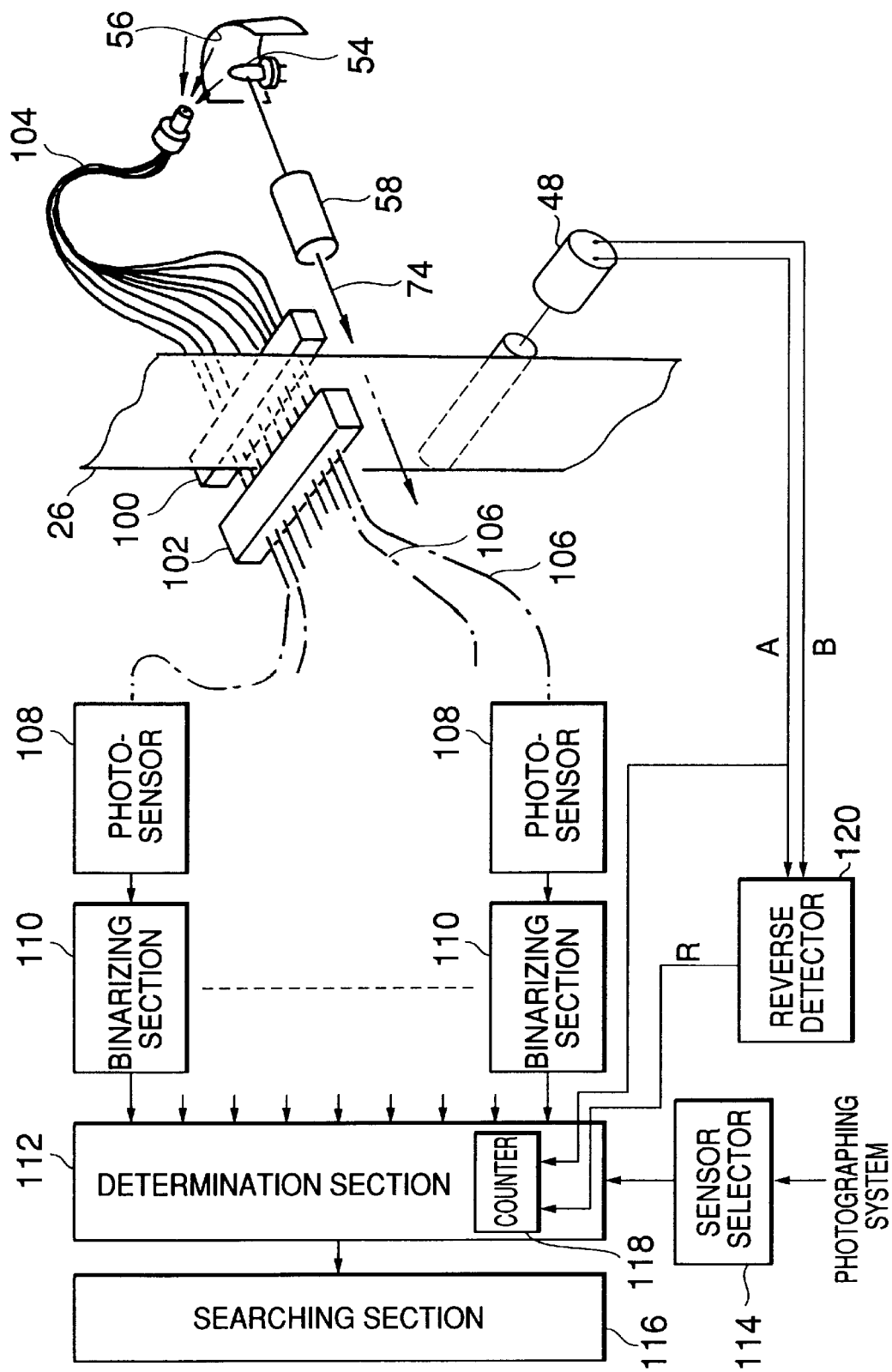

MICROFILM SEARCH DEVICE AND METHOD

BACKGROUND OF THE INVENTION

1. Field of the Invention

The present invention relates to a microfilm search device which determines the presence of frames from a density change in the microfilm running direction, particularly to a microfilm search device which detects a frame dimension or a dimension between frames from a density change in the microfilm running direction to determine the presence of frames and search for a desired frame. The present invention also relates to a method of detecting a frame dimension or a dimension between frames from a density change in the microfilm running direction.

2. Description of the Related Art

In a known microfilm search method, document or image marks (blips) are photographed or recorded besides the frames on microfilm and used as reference marks. The blips of microfilm during running are read and counted, and the blip count is used to identify frame addresses when a specific frame is sought.

On the other hand, there is proposed a search method in which, instead of using the blips, the presence of frames is directly detected, and a desired frame is searched for from a sequence of detected frames. Specifically, a density sensor is disposed within the travel width of the frame, so that the presence of frames is determined from a change in film density detected by the density sensor.

In order to detect the presence of frames in this manner, at least one pair of optical fibers are provided whose end faces are opposed to each other with a microfilm placed therebetween. The light is emitted from one optical fiber and transmitted through a film. The light transmitted through the film is received by the other optical fiber, and the quantity of received light is detected by a photosensor. In this case, a signal (density signal) indicating the film density detected by the photosensor is binarized with a predetermined threshold value into a white or black signal. The white signal represents a film transparent portion and the black signal represents a film non-transparent portion. Based on the white or black signal(s), a frame or an area between frames (between-frames) is detected. For example, in a negative film, since the background of a frame is recorded as black and the between-frames is recorded as white (transparent), the binarized density signal indicates black for the frame and white (transparent) for the between-frames. The binarized signal turns to logic ZERO ("0"; level L) inside each frame (black), and turns to logic ONE ("1"; level H) between the frames (white).

It is then determined that the area where the binarized signal becomes logic ZERO is the frame while the area where the binarized signal becomes logic ONE is the between-frames. Specifically, while the logic ZERO or ONE is maintained, sampling (pulse) signals outputted from an encoder are counted to detect a length in which the logic ZERO or ONE is obtained on the film. Subsequently, by comparing the detected length (frame dimension, or dimension between frames) with the predetermined set value (set range), the presence of frames can be determined.

However, the diameter of the optical fiber is finite length and cannot be infinitely reduced. In additions, the light is diffused during the light is emitted from the optical fiber on the light emitting side, passes through the film and reaches to the optical fiber on the light receiving side. As a result, the frame dimension or the dimension between frames cannot be accurately determined by using a change of the density signal obtained by the photosensor. Therefore, there is a problem that it is difficult to determine the presence of frame with high accuracy and, accordingly, the accuracy of searching for a desired frame is lowered.

Moreover, in the detection of frames, if the frame contains therein a null area, i.e., a portion having substantially the same density as that of an area between frames (between-frames), this portion is erroneously determined as the between-frames. For example, when the microfilm is a negative film, a background portion in the frame on which image or document is photographed becomes black (non-transparent), while a peripheral portion surrounding the frame is white (transparent). When black characters or figures are depicted on a white background of the original, the character or graphic region becomes transparent (null) in the frame. Accordingly, when the presence of frames is determined from a density change on the microfilm, the transparent (null) area other than a between-frames is incorrectly determined as the between-frames. This causes an error in counting the number of frames, and therefore, correct frame search cannot be performed.

To solve the problem, there may be proposed a method in which the length of the transparent null area is detected. Specifically, when the detected length is within the set range, the transparent area is determined as a null area. When the detected length is beyond the set range, the transparent area is determined as a between-frames. In this case, however, if the film feeding direction is reversed during the detection of the transparent portion in the frame, the length of the transparent portion may be detected longer than actual. For example, if the film feeding direction is reversed while the length of the white (transparent) area is counted, the length is counted twice at maximum as long as the actual length. Therefore, the transparent null area may be incorrectly determined to be the between-frames. Since the number of frames is counted more than actual, the desired frame cannot be correctly sought.

SUMMARY OF THE INVENTION

The present invention has been accomplished under the circumstances above, and an object thereof is to provide a microfilm search device in which the presence of frames can be determined with high accuracy so that a desired frame can correctly be searched for without frame detection error.

Another object of the present invention is to provide a microfilm search device in which when a microfilm is passed between the end faces of a pair of opposed optical fibers to determine the presence of frames from a change in the quantity of light transmitted through the microfilm, a frame dimension or a dimension between frames is detected with high accuracy, and the frame searching accuracy can be enhanced.

Further object of the present invention is to provide a microfilm search device which prevents a null area in a frame from being incorrectly determined as an area between frames even if there is in the frame an area (a transparent null area in a negative film) having substantially the same density as that of the outside of the frame (area between frames) or even if the film feeding direction is changed during searching and which can correctly detect frames and prevent searching errors.

Still further object of the present invention is to provide a frame/between-frames dimension detecting method in which when a microfilm is passed between the end faces of a pair of opposed optical fibers to determine the presence of frames from a change in the quantity of light transmitted through the microfilm, a frame dimension or a dimension between frames can be detected with high accuracy.

In one aspect of the present invention, there is provided a microfilm search device for searching a desired frame from a microfilm by detecting the presence of frames from a density change in the running direction of the microfilm, comprising:

a) an encoder for outputting a sampling signal for each predetermined feeding amount of the microfilm;

b) a pair of optical fibers whose end faces are opposed to each other while the microfilm is placed between the end faces within a frame travel width;

c) a light source for guiding light to one of said optical fibers;

d) a photosensor for detecting the quantity of light incident on the other optical fiber to output a density signal;

e) a binarizing section for binarizing the density signal into a white or black signal in synchronization with the sampling signal, the white signal representing a film transparent portion and the black signal representing a film non-transparent portion;

f) a determination section for detecting a frame dimension or a dimension between frames based on the binarized density signal and comparing the dimension with a set value to determine the presence of frames and output a determination signal; and g) a searching section for searching for the desired frame based on the determination signal.

When the frame dimension or the dimension between frames is detected from the length of a portion where the white signals are continuously obtained, the set value is set longer than an actual frame dimension or an actual dimension between frames. Or, when the frame dimension or the dimension between frames is detected from the length of a portion where the black signals are continuously obtained, the set value is set shorter than the actual frame dimension or the actual dimension between frames.

The determination section herein may correct the frame dimension or the dimension between frames detected from the binarized signal, instead of correcting the set value. Of course, both of the set value and the frame/between-frames dimension may be corrected.

In another aspect of the present invention, there is provided a frame/between-frames dimension detecting method for use in a microfilm search device for detecting the presence of frames from a density change in the running direction of a microfilm, comprising the steps of:

guiding light to one of a pair of optical fibers whose end faces are opposed to each other with the microfilm placed therebetween;

detecting the quantity of light incident upon the other optical fiber with a photosensor to obtain a density signal;

binarizing the density signal into a white or black signal in synchronization with each predetermined feeding amount of the microfilm;

obtaining a dimension of a frame or an interspace between frames based on the binarized density signal;

correcting the dimension to shorten the dimension, when the dimension is detected from the length of a portion where the white signals are continuously obtained; and correcting the dimension to lengthen the dimension, when the dimension is detected from the length of a portion where the black signals are continuously obtained.

In further aspect of the present invention, there is provided a microfilm search device for searching a desired frame from a microfilm by detecting the presence of frames from a density change in the running direction of the microfilm, comprising:

a) an encoder for outputting a pulse signal for each predetermined feeding amount of the microfilm;

b) a density sensor for detecting the film density of the microfilm along the running direction of the microfilm to output a density signal;

c) a binarizing section for binarizing the density signal into a white or black signal in synchronization with the pulse signal, the white signal representing a film transparent portion and the black signal representing a film non-transparent portion;

d) a counter for counting the pulse signal to obtain a film travel amount, the counter being reset at the time of frame detection and at the time of film reversing;

e) a reverse detector for detecting a change of the film running direction to reset the counter;

f) a determination section for counting the number of either one of the binarized signals based on the counter to determine the presence of frames and output a determination signal; and g) a searching section for searching for the desired frame based on the determination signal.

As a photographing system for recording images on the microfilm, there are Simplex, Duo, Duplex, and other film photographing systems. Preferably, therefore, a plurality of density sensors are provided in a film width direction in such a manner that film densities can be detected for frames photographed in any of the systems. The density sensor corresponding to the photographing system can be selected for use in detecting the presence of frames.

The determination section may determine that the detected area is the area between frames when the count of the contiguous white signals indicating the film transparent portion is larger than the threshold value corresponding to a distance slightly smaller than the actual distance between frames. Instead of the method, the determination section may use another method in which, for example, when the film feeding direction is reversed, the counting of the counter is stopped (reset) until the binarized signal changes next, and the counting is restarted.

The film density of one frame can be detected with a plurality of density sensors arranged in the film width direction. In this case, the presence of frames can be determined using the binarized signal based on the output of each density sensor. The presence of frames may be determined, for example, when all of plural binarized signals become coincident. Alternatively, when the majority or more than the constant ratio of determination results obtained by each density sensor represent black (in-frame portion of a negative film), it is determined that there is a frame. Moreover, the presence of frames may be determined using the logical product or the logical sum of a plurality of binarized signals.

BRIEF DESCRIPTION OF THE DRAWINGS

FIG. 5 is a diagram showing an arrangement of main parts of the microfilm search device of the embodiment and explaining an flow of operation according to the present invention;

FIG. 7A shows the arrangement of frames on the film; and FIG. 7B shows the positional relationship of the frame and optical fiber end face, further showing a density signal (a) obtained when the optical fiber end face 3 crosses a frame 2 and a binarized signal (c) obtained by binarizing the density signal (a);

FIG. 8A shows the arrangement of frames on the film; and FIG. 8B shows the positional relationship of the frame and optical fiber end face, further showing the density signal (a) obtained when the optical fiber end face 3 crosses the frame 2 and the binarized signal (c) obtained by binarizing the density signal (a); FIG. 9A shows the travel of a photosensor PS on the negative film; FIG. 9B shows a binarized signal B1 obtained by binarizing the output of the photosensor; FIG. 9C shows a binarized signal B2 when the photosensor is reversed halfway; and FIG. 9D shows a change with time of the counted value when the binarized signal B2 is counted by a counter.

DETAILED DESCRIPTION OF THE PREFERRED EMBODIMENT

Principle of the First Aspect of the Invention

Figure 7A:
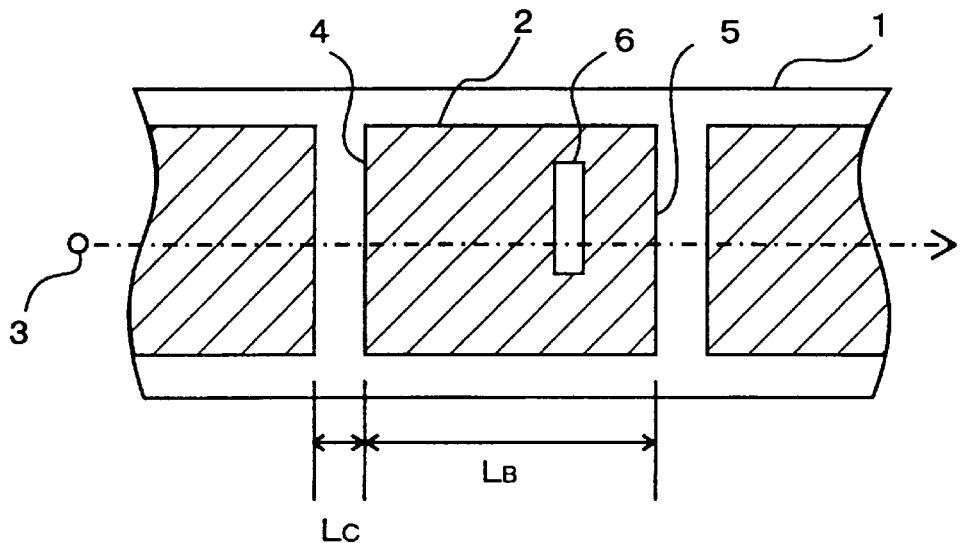
FIGS. 7A and 7B are explanatory views of the principle according to the first aspect of the present invention with a negative film.

The principle of the first aspect of the present invention will be described with reference to FIGS. 7 and 8. FIGS. 7A and 7B show a case where a negative film is used. In FIG. 7A, a reference numeral 1 denotes a microfilm, and an original is photographed in a negative system in which white and black are reversed. Accordingly, in the frame 2, a white background of an original is recorded as black on the film, while characters or graphic images in the original are recorded as white (transparent) on the film.

The position of an end face of an optical fiber for detecting the density of the film 1 is denoted by numeral 3. There are provided a pair of optical fibers whose end faces 3 are opposed to each other with the film 1 placed therebetween. The light guided from one of the optical fibers reaches one surface of the film 1, and the light transmitted through the film 1 enters the other optical fiber. The quantity of incident light is detected by a photosensor.

Figure 7B:
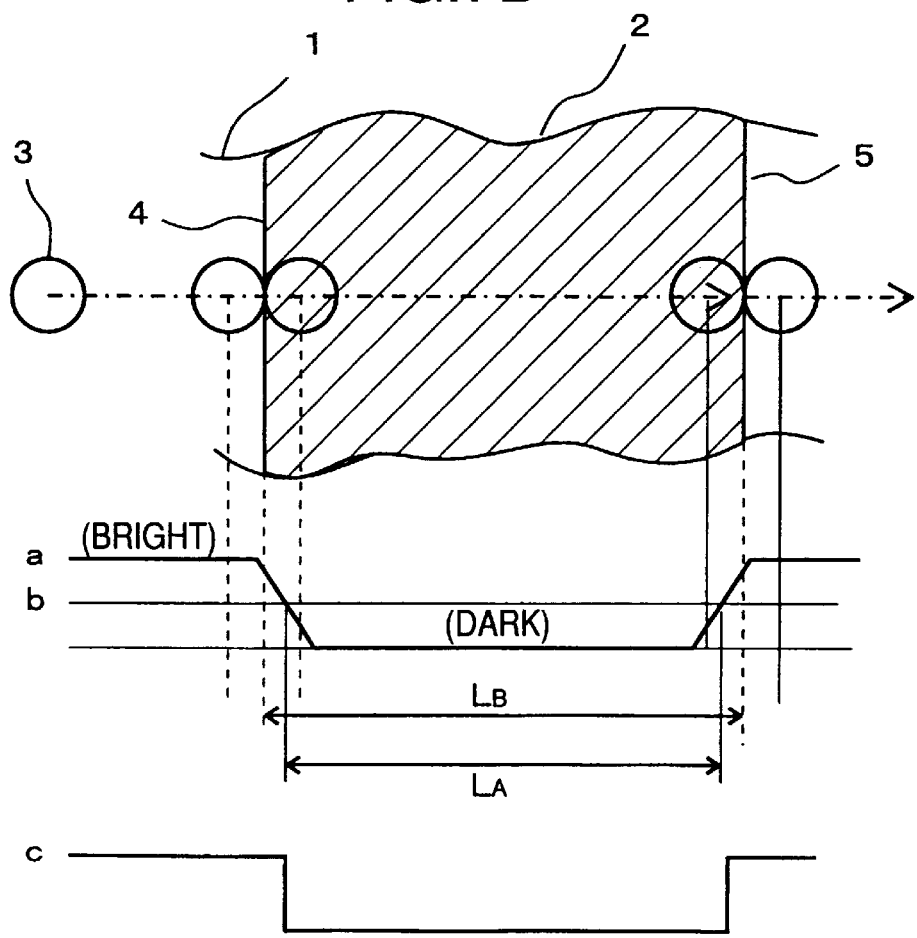

FIG. 7B shows a density signal (a) outputted from the photosensor. Assuming that the film 1 is fed toward the left side in the figure, the end face 3 of the optical fiber relatively moves toward the right, and the quantity of light received by the photosensor changes as shown by the density signal (a). The density signal (a) is binarized by a predetermined threshold value (b) to obtain a white (bright) or black (dark) binarized signal (c). The white and black signals represent or correspond a film transparent portion and film non-transparent portion, respectively.

The light radiated from the end face 3 of one optical fiber to the film 1 is spread to have the area of the end face 3 (diameter of about 0.5 mm). There is a remarkably slight space between the end face 3 and the film 1. The light emitted from the end face 3 is transmitted through the film 1 while being diffused. Therefore, the light emitted from one end face turns from a bright (transparent) area to a dark (non-transparent) area on a front edge 4 of the frame 2. As a result, the bright area represented by the density signal (a) is slightly spread toward the dark area on the edge 4 (FIG. 7B).

This phenomenon occurs not only on the front edge 4 of the frame 2 but also on a rear edge 5 in the same manner. Therefore, if the density signal (a) is binarized, frame dimension $L_A$ obtained by continuous black (dark) signals (c) is smaller than an actual frame dimension $L_B$. In the present invention, a difference between the dimensions $L_B$-$L_A$ is corrected to obtain an accurate frame dimension. In this case, the detected frame dimension $L_A$ may be lengthened and corrected. When a between-frames dimension $L_C$ is obtained in the same manner (refer to FIG. 7A), the dimension $L_C$ is shortened and corrected.

Figure 8A:
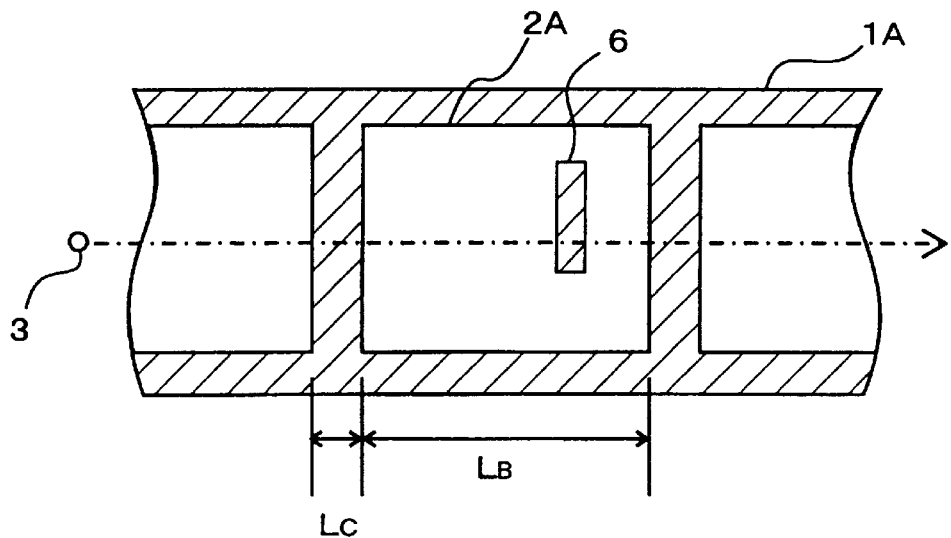
FIGS. 8A and 8B are explanatory views of the principle according to the first aspect of the present invention with a positive film.

FIG. 8 shows a case that a positive film 1A is used, in lieu of the negative film. In this case, the state is reverse to that in FIG. 7. Specifically, for a density signal (a1), a bright area is spread from a frame 2A to its peripheral dark area. When the density signal (a1) is binarized with a threshold value (b1) (set in the same level as that of the value (b)), the bright area represented by the continuous white binarized signal (c1) is spread from the actual dimension $L_B$ of the frame 2A toward the outside. Therefore, a frame dimension $L_D$ obtained from the binarized signal (c1) is larger than the actual frame dimension $L_B$.

In the present invention the obtained frame dimension $L_D$ is shortened by correction. The concept of the present invention will now be described by integrating the cases of FIGS. 7 and 8. The frame dimension or the dimension between frames obtained from the binarized density signal, i.e., the frame dimension $L_A$, $L_D$ or the dimension between frames obtained from the binarized signal (c), (c1) is shortened on the bright side of the density signal (a), (a1), and lengthened on the dark side to correct the dimension. As apparent from the above description, the corrected amount may be $L_B$-$L_A$, $L_D$-$L_B$. Additionally, instead of correcting the detected frame dimension $L_A$, $L_D$, the set value to be compared with the dimension $L_A$, $L_D$ may be corrected.

Figure 8B:
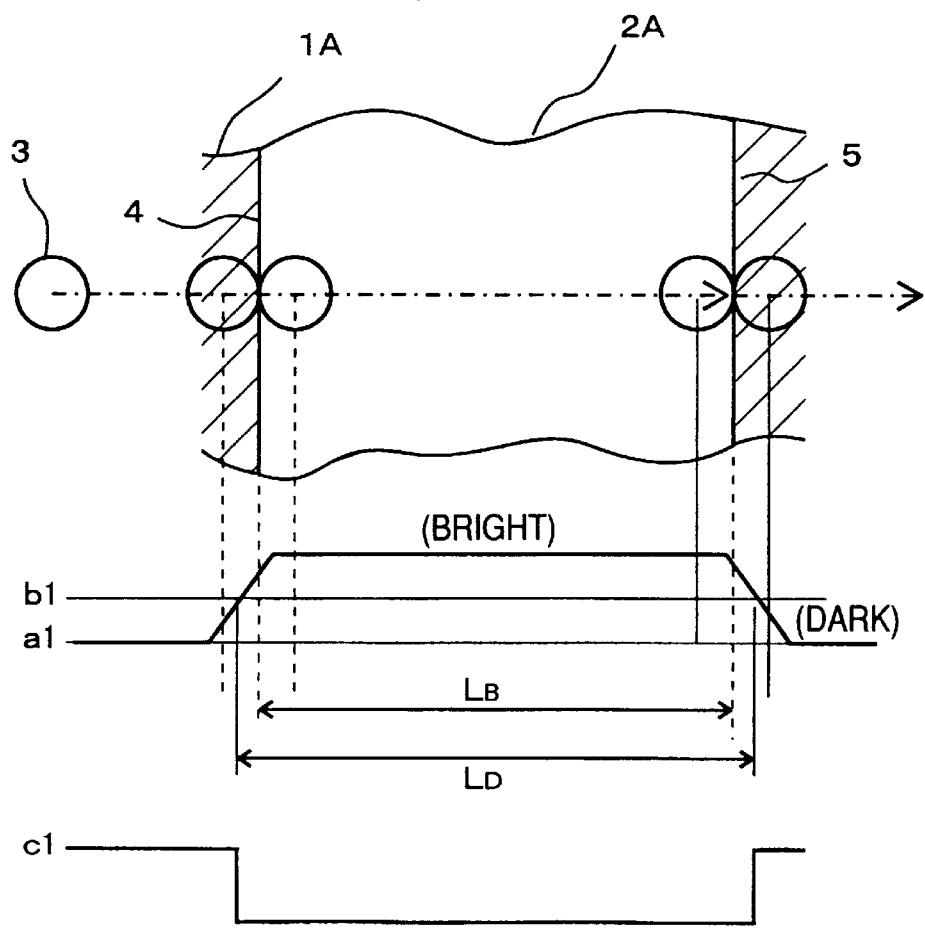

A case in which there is a null area in the frame on the negative film will be described. As shown in FIG. 7A, if there is a null area 6 in the frame 2, the length of the area in the film running direction is detected to be longer than the actual length in the same manner as shown in FIG. 8B. Assuming that the detected length is longer than the between-frames distance $L_C$, the null area 6 is also incorrectly recognized as the area between frames. In the present invention, however, after shortening and correcting the detected length of the null area, it is compared with the set value $L_C$ for detecting the area between frames. Therefore, the incorrect recognition of the null area 6 as the area between frames is minimized.

Principle of the Second Aspect of the Invention

Figure 9A:
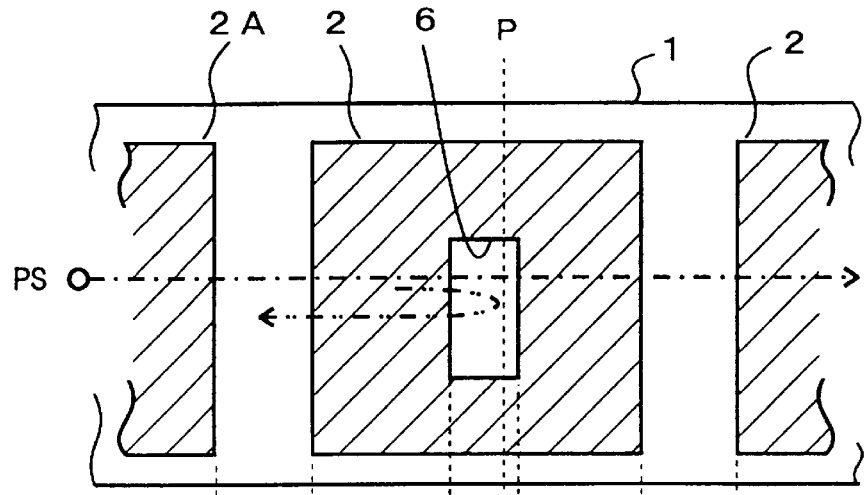
FIGS. 9A to 9D are explanatory views of the principle according to the second aspect of the present invention.

The principle of the second aspect of the present invention will be described with reference to FIG. 9. In FIG. 9A, a frame 2 is photographed every constant interval on a negative film 1. In the frame 2, the white background of the original is recorded as black (non-transparent) and the character or graphic image of the original is recorded as white (transparent).

It is assumed that there is a transparent null area 6 in the frame 2. The null area 6 corresponds to a portion filled with black (blackened area) in the original. When the film 1 runs toward the left side on FIG. 9A, a photosensor PS relatively scans the film 1 toward the right side to detect the density change of the film.

Figure 9B:
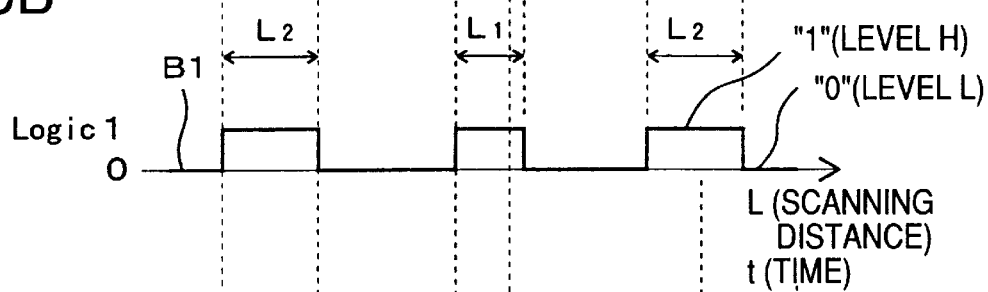

FIG. 9B shows a binarized signal B1 obtained by binarizing the output of the photosensor PS with a predetermined threshold value. In FIG. 9B, the abscissa axis shows a scanning distance L or a time t of the photosensor PS. The signal B1 becomes logic ONE (level H) outside the frame 2 (transparent null area) and logic ZERO (level L) in the background area in the frame 2. A distance (length) $L_1$ in the scanning direction of the null area 6 in the frame 2 is usually shorter than a distance $L_2$ between frames. Therefore, a threshold value $L_3$ for discriminating the between-frames may be set as a value having a length between $L_1$ and $L_2$. When the distance L of the detected area in which logic ONE is obtained is equal to or less than the threshold value $L_3$, it is determined that the detected area is the null area 6 in the frame 2. If the distance is longer than $L_3$, it is determined that the area is the interspace area between frames.

Figure 9C:
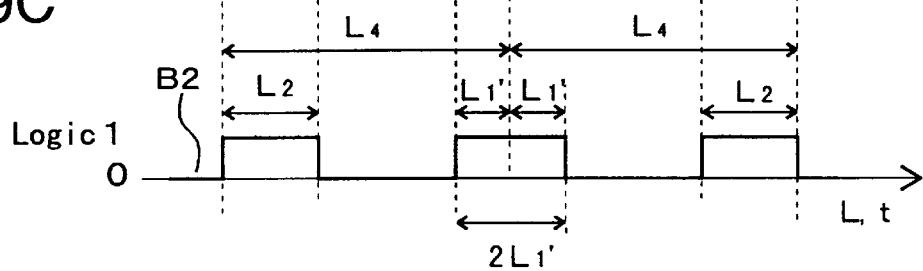

FIG. 9C shows a binarized signal B2 when the feeding direction of the film 1 is reversed during the detection of the null area 6 in the frame 2 by the photosensor PS. The binarized signal B2 is symmetrical on a reverse time P of the film feeding direction. Specifically, the distance $L_4$ from a terminal end of the previous frame 2A to the reverse point P is equal to the distance $L_4$ until the terminal end (detected as a front end this time) of the frame 2A is detected after reversing. In the same manner, a distance $L_1'$ till the reverse point P after entering into the null area 6 is equal to the distance $L_1'$ until leaving from the null area 6 after reversing. Therefore, if the film is reversed halfway, the distance while the null area 6 is entered and exited is $2L_1'$, and the distance $2L_1'$ may be larger than the threshold value $L_3$ ($2L_1'>L_3$). When the film feeding direction is reversed in this manner, it is often that even the null area usually smaller than the dimension between frames may be incorrectly recognized as the area between frames. This is causes an error in couning the number of frames, and therefore, correct frame search cannot be performed.

Figure 9D:
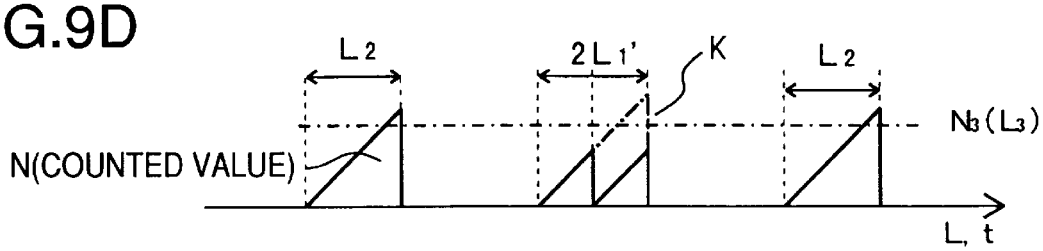

For example, the film travel distance L is measured as follows. Pulse signals outputted from a rotary encoder for a predetermined feeding amount of the film 1 are counted with the counter. The counting is conducted while the binarized signals B1, B2 are logic ONE, and the counter is reset when they are logic ZERO. With such a constitution, the count N changes as shown in FIG. 9D. When the count N exceeds a count (threshold count value) N3 corresponding to the threshold value $L_3$, the area of the logic ONE is determined to be the area between frames. If the counter continues counting before and after the film feeding reverse point P as aforementioned, however, the count N becomes larger than the threshold count N3 as shown by an imaginary line K of FIG. 9D, and the area between frames may be determined in error.

To avoid the problem, in the present invention, the counter is reset to zero at the reverse point P. Through resetting, the count N starts to be counted again from zero at the time P, and the count N does not exceed the threshold count value N3 any more (refer to a solid line of FIG. 9D). Therefore, the null area 6 is prevented from being determined to be the area between frames in error, so that correct searching can be realized.

EMBODIMENT

Figure 1:
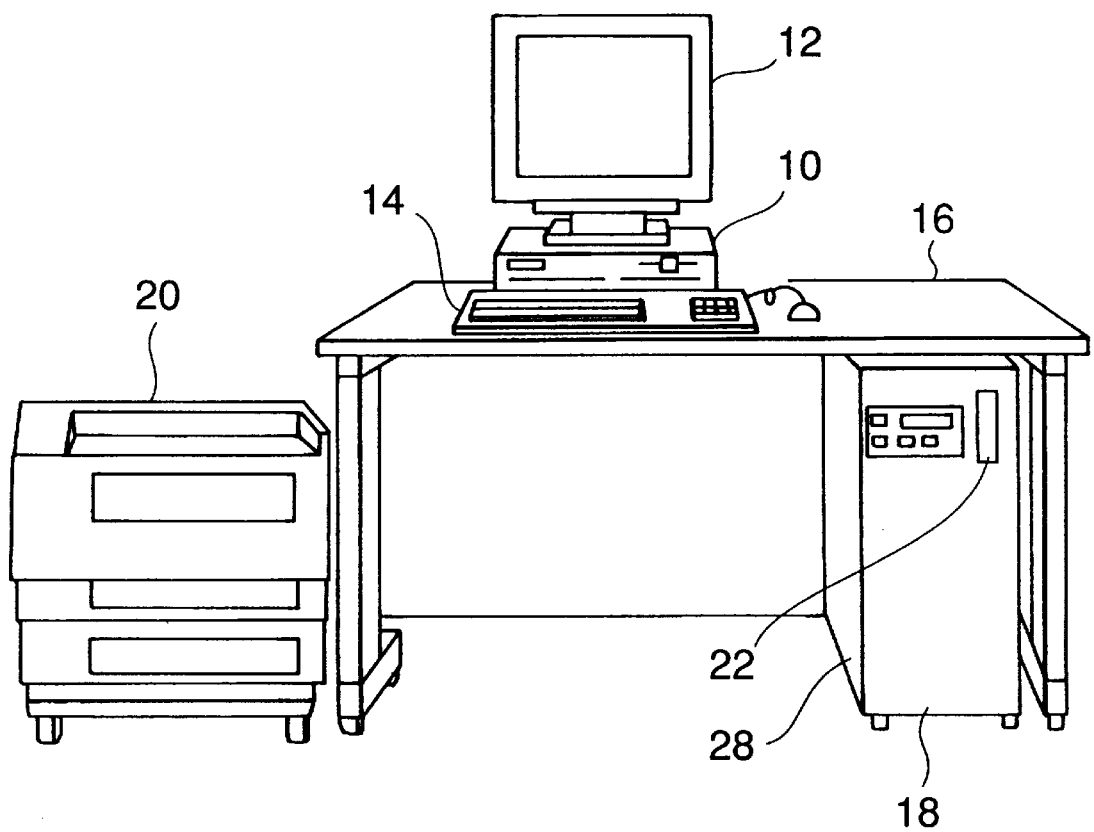
FIG. 1 is a diagram showing an image reading and processing apparatus which incorporates a microfilm search device of an embodiment according to the present invention.

In FIG. 1, a reference numeral 10 denotes a computer body containing a CPU or other processing means. Display means 12 such as a CRT or a liquid crystal panel, and a keyboard 14 are placed on a desk 16. A scanner 18 is stored under the desk 16 and incorporates therein a microfilm search device according to the present invention. Numeral 20 denotes a printer placed beside the desk 16.

The scanner 18 has a cartridge insertion port 22 formed in the upper portion of its front panel. The scanner 18 reads, at a low resolution, an image on a roll of microfilm 26 with a width of 16 mm held in a cartridge 24 (refer to FIGS. 2 and 3) which is loaded through the insertion port 22. The CPU in the computer body 10 performs a predetermined image processing of the read image, and the resultant image is displayed on the display means 12.

The reading or scanning operation of the image is carried out while the roll film 26 moves without moving a line sensor 96, which will be described hereinafter in details.

During the operation, the CRT display device 12 sequentially changes and displays the read image synchronously with the travel of the film 26. Therefore, the displayed image moved in the display surface of the CRT 12 is in synchronization with the travel of the film 26, so that the displayed image may be substantially the same as that which is projected on a screen.

For a manual search, an operator monitors the image on the display means 12 and instructs a print output of a required image on the display means 12. In response to this output instruction, the scanner 18 sets a corresponding frame in the correct position, and reads the entire image on the frame at a high resolution. The high density image is printed by the printer 20, and either stored in an optical magnetic disk, a hard disk, or the like, or transferred to an external storage device.

For an automatic search, the address of a desired frame is input through the keyboard 14. In the automatic search, as aforementioned, the frames on the microfilm 26 are detected, and the number of the frames is counted to search for a desired frame. The frame search is performed by a searching section 116 described later using the determination results of a determination section 112 indicating the presence of frames.

The structure of the scanner 18 will now be described. The scanner 18 has a vertically longitudinal casing 28, in which there are arranged a feed reel driving unit 30 in the upper portion of the front side and a take-up reel driving unit 32 at the lower portion of the front side. When the cartridge 24 is inserted into the cartridge insertion port 22, the cartridge 24 is moved automatically so that a reel 24A held in the cartridge 24 engages with a rotating shaft of the feed reel driving unit 30. And then, the feed reel driving unit 30 pulls out the leader portion of the roll film 26 from the cartridge 24 and feeds it downward to guide it to a take-up reel 32A in the take-up reel driving unit 32.

Figure 2:
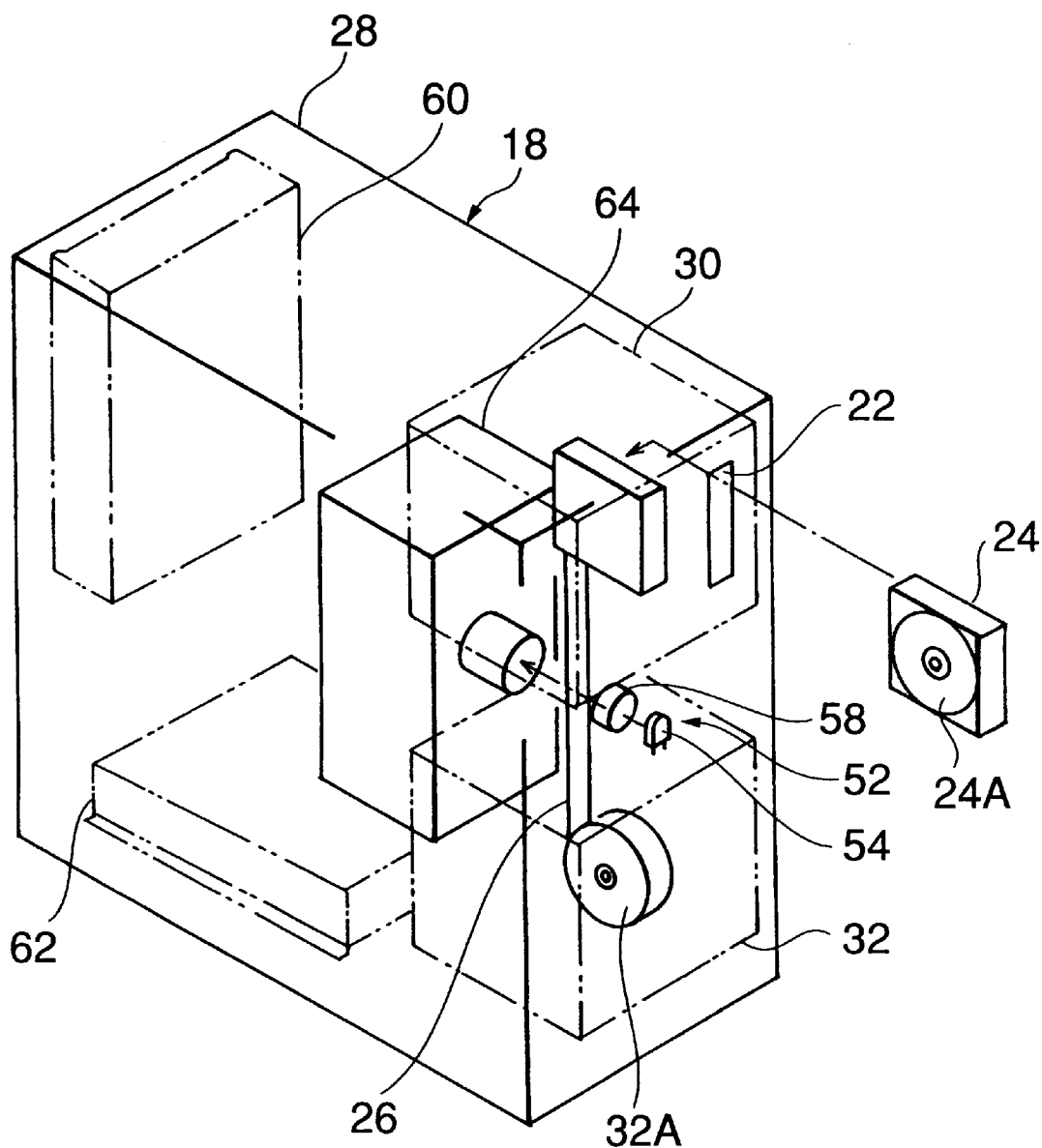
FIG. 2 is a perspective view illustrating the interior of a scanner for use in the embodiment of FIG. 1.
Figure 3:
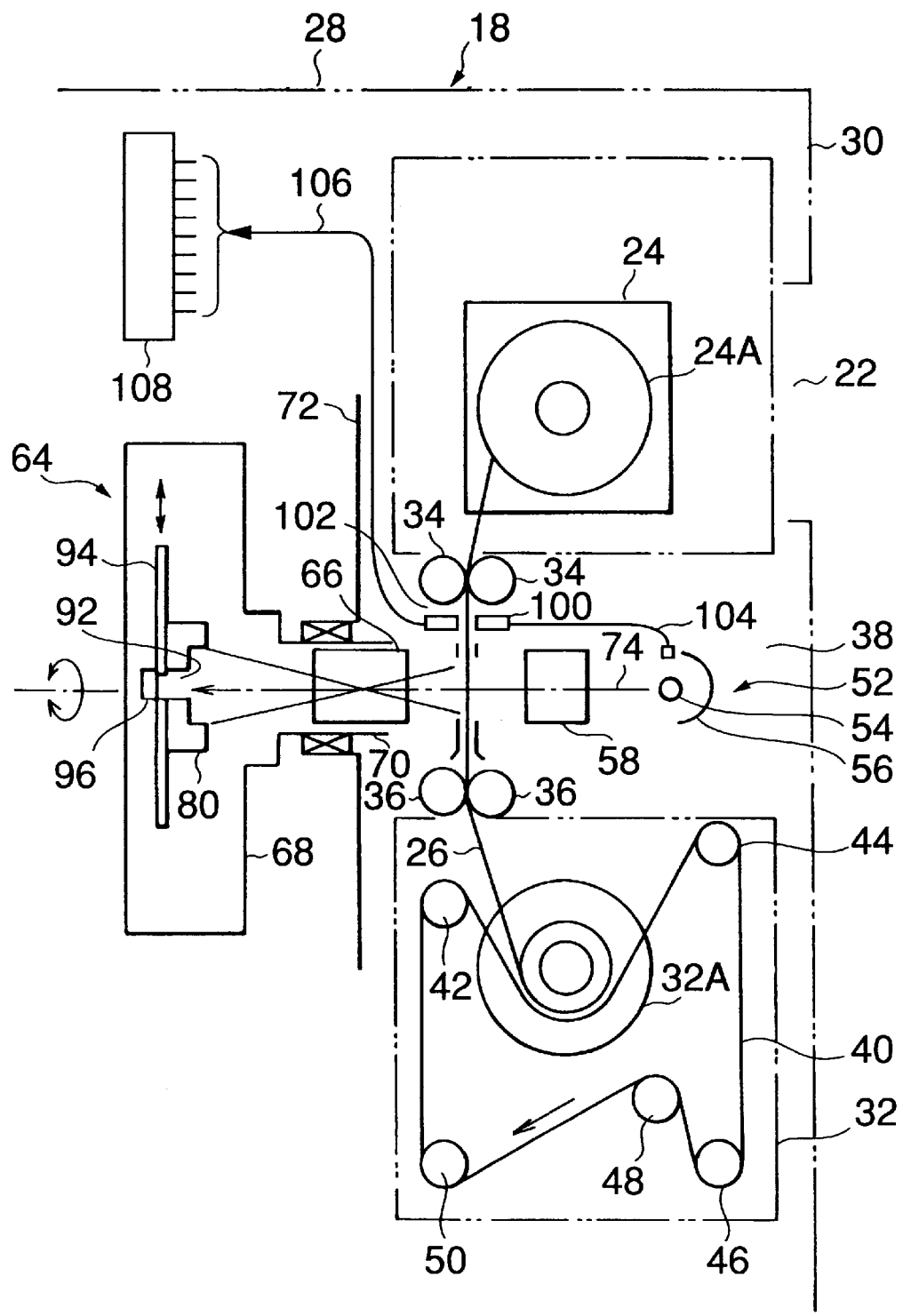
FIG. 3 is a side view illustrating an arrangement of main parts of the scanner shown in FIGS. 1 and 2.

When viewing the scanner 18 in FIGS. 2 and 3, the film 26 passes through the rear side of the open space between the reel driving units 30, 32, that is, the film 26 passes through at the inner back side viewed from the front of the casing 28. Referring to FIG. 3, there are shown guide rollers 34, 34, 36 and 36 for guiding the film 26. Accordingly, a space 38 is defined by the open area between the reel driving unit 30, 32 and a front panel 28A of the casing 28, and a light source 52, which will be described later, is housed in this space 38.

The take-up reel driving unit 32 has a drive belt 40 which travels while contacting the reel 32A as shown in FIG. 3. The drive belt 40 is wound on guide rollers 42 and 44, a drive roller 46, a rotary encoder 48 and a tension roller 50, and it is driven by the drive roller 46 in a film take-up direction (indicated by an arrow in FIG. 3). The rotary encoder 48, which is of an incremental type, outputs two rectangular wave pulse signals having a phase difference of 90 degrees, i.e., a lead pulse A and a lag pulse B (refer to FIG. 5) every time a constant feeding amount of the film 26 (e.g., 0.1 mm) is reached. One of the pulse signals A and B functions as a sampling signal to determine a timing for binarizing the density signal.

The light source 52 is housed in the space 38 between the above-described reel driving units 30 and 32, and includes a lamp 54, a reflection mirror 56, a condenser lens 58, and an appropriate filter. In FIG. 2, a power supply circuit 60 and a power control circuit 62 for controlling an actuator such as a motor are illustrated.

Figure 4:
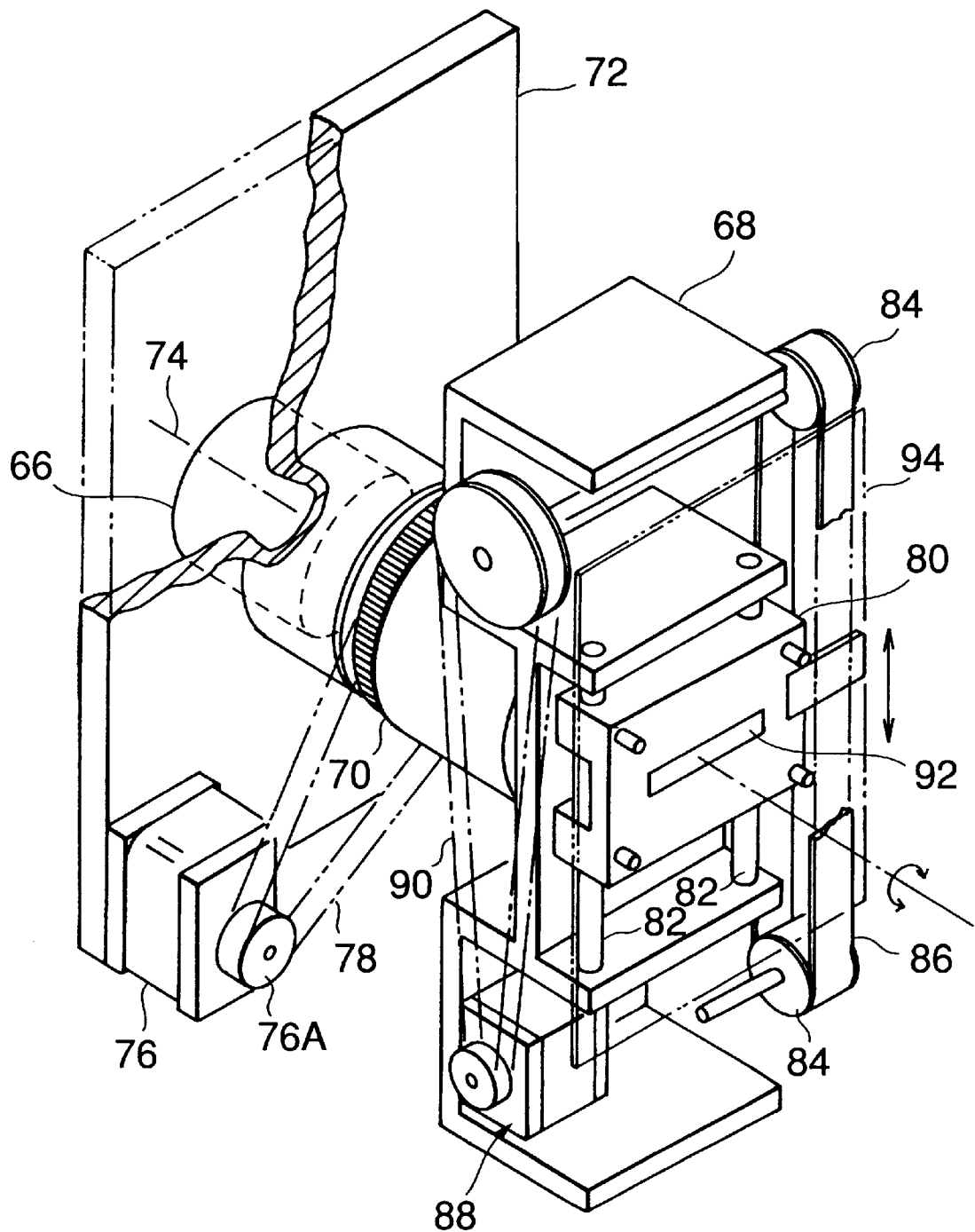
FIG. 4 is a perspective view illustrating a line sensor unit in the scanner of FIG. 3.

A line sensor unit 64 will now be described. The line sensor unit 64 is integrated with a projection lens 66. More specifically, as shown in FIGS. 3 and 4, a cylindrical portion 70 for holding the projection lens 66 is integrally formed with a frame (rotatable frame) 68 of the line sensor unit 64. The projection lens 66 mounted in the cylindrical portion 70 is a fixed focus lens with a magnifying power of approximately two. The cylindrical portion 70 is rotatably supported by a frame (fixed frame) 72, which is secured to the casing 28, so that the inclination of an image to be read can be corrected. The cylindrical portion 70 rotates about a light axis 74 perpendicular to the surface of the film 26.

A belt 78 is wound around the cylindrical portion 70 of the rotary frame 68 and a pulley 76A of a servo motor 76 mounted on the fixed frame 72. As the servo motor 76 rotates, the rotary frame 68 rotates around the light axis 74.

On the rotatable frame 68, a movable plate 80 is provided on the side opposite to the cylindrical portion 70 as shown in FIG. 4. The movable plate 80 is slidably mounted on a pair of guide rods 82, 82 to permit the movable plate 80 to reciprocate in the vicinity of an opening of the cylindrical portion 70 in a direction perpendicular to the light axis 74.

In the rotatable frame 68, a belt 86 wound on pulleys 84, 84 extends in a direction parallel to the up-and-down moving direction of the movable plate 80, and one side of the movable plate 80 is fixed to the belt 86. The rotation of a servo motor 88 is transmitted via a belt 90 to one of the pulleys 84. With this structure, when the servo motor 88 rotates forward and in reverse, the movable plate 80 reciprocates across a plane perpendicular to the light axis 74.

On the movable plate 80, an elongated window (narrow slit) 92 is formed in a direction perpendicular to the guide rods 82, 82, i.e., in a direction perpendicular to the up-and-down moving direction of the movable plate 80. The window 92 has its longitudinal center that corresponds with the light axis 74. A printed circuit board 94 is fixed to the rear face of the movable plate 80, i.e., the face opposite to that facing the cylindrical portion 70, so as to be perpendicular to the light axis 74.

A longitudinal CCD arrayed line sensor 96 is fixed to the board 94 to face the window 92 (FIG. 3). In addition, a preamplifier for amplifying the output of the line sensor 96 is mounted on the board 94. The positioning of the light reception face of the CCD line sensor 96 must correspond to a plane on which an image projected from the projection lens 66 is focused.

A frame detecting device will next be described with reference to FIG. 5. In a position in front of the position where an image on the microfilm 26 is read, i.e., on the upstream side of the light axis 74 (the side of the feed reel 24A), a pair of optical fiber holding blocks 100 and 102 are provided in such a manner that they extend across the film 26 along the width direction and they are opposed to both faces of the film 26 with slight gaps. Optical fibers 104 and 106, nine each being arranged in the film width direction, are inserted through the blocks 100 and 102, respectively.

The optical fibers 104, 106 are held in the blocks 100, 102, so that the optical axes of the fibers 104, 106 are perpendicular to the film 26, and end faces of the fibers 104, 106 are opposed to each other with the film 26 placed therebetween. Specifically, the end faces of nine optical fibers 104 are opposed to the end faces of nine optical fibers 106, respectively. As a result, there are nine sets of the opposed end faces with the film 26 placed therebetween.

Nine optical fibers 104 held in the block 100 are bunched and guided toward the vicinity of the lamp 54 of the light source 52. Light beams are radiated from the lamp 54 to the nine optical fibers 104, and guided to one surface (surface on the side of the block 100) of the film 26.

The light beams emitted from the nine optical fibers 104 pass through the film 26 and enter the opposed optical fibers 106 held in the block 102. The nine optical fibers 106 are guided from the block 102 to the nine photosensors 108, respectively. Density signals outputted from the nine photosensors 108 are separately transmitted to binarizing sections 110, sampled in synchronization with the pulse signal A or B outputted from the encoder 48, and binarized with a predetermined threshold value. The threshold value is set in accordance with a difference in density between a frame and an outer periphery of the frame.

Nine binarized signals are transmitted to the determination section 112, in which determination results indicative of the presence of frames are obtained based on the output of each photosensor 108. The determination section 112 corrects the frame dimensions $L_A$, $L_D$ obtained from the binarized signals (refer to FIGS. 7B and 8B) or the between-frames dimension as aforementioned. Instead of correcting the frame dimensions $L_A$, $L_D$ or the between-frames dimension, the set values to be compared with the dimensions may be corrected. The corrected set values are inputted separately, for example, via the keyboard 14 (FIG. 1). The corrected set values may be automatically calculated and stored in the determination section 112 by reading the predetermined frame or between-frames dimension beforehand and inputting the correct frame or between-frames dimension via the keyboard 14.

In the determination section 112, the presence of frames is determined by comparing the obtained frame or between-frames dimension (or the corrected frame or between-frames dimension) with corrected set values (or non-corrected set values).

A signal of a sensor selector 114 is also supplied to the determination section 112. The sensor selector 114 selects the photosensor(s) 108 connected to the desired optical fiber(s) 106 whose end face is positioned within the frame travel width corresponding to the film photographing system such as Simplex, Duo, Duplex or the like. The determination section 112 selects only the determination result(s) of the photosensor(s) 108 selected by the selector 114 from the nine determination results to determine the presence of frames in accordance with the corresponding photographing system. The determination result is transmitted to the searching section 116, so that the number of frames is counted to seek for the desired frame.

When the feeding direction of the film 26 is reversed, a counter 118 for detecting the film feeding amount is reset to have a counted value of zero. Specifically, as shown in FIG. 5, a reverse detector 120 monitors the film feeding direction based on the pulse signals A, B outputted from the encoder 48, and transmits a reset signal R to the counter 118 when the film feeding direction is reversed. Therefore, the counted value of the pulse signal A or B is returned to zero.

The counter 118 is also reset every time the background area (black) in the frame is detected by the photosensor 108. Although one counter 118 is shown in FIG. 5, the determination section 112 may be provided with the nine counters, each of which corresponds each of the nine binarizing sections 112. Instead of using nine counters 118, a plurality of counters 118 may be used in a different combination for the binarizing section(s) 110 corresponding to the photosensor(s) 108 selected by the sensor selector 114. The counter 118 is incorporated in the determination section 112 in FIG. 5, but may be constituted separately from the determination section 112.

As shown in FIGS. 5 and 6, the end faces of the nine optical fibers 104 or 106 are positioned on straight lines perpendicular to the running direction of the film 26 and in different positions in the width direction of the film 26. In the embodiment, since the photosensors 108 detect the quantity of light incident on the optical fibers 106, the photosensors 108 are substantially arranged in positions where the end faces of the optical fibers 106 are opposed to the film 26. Therefore, FIG. 6 shows the photosensors 108 in the positions of the end faces of the optical fibers 106 on the side of the film 26.

Figure 6A:
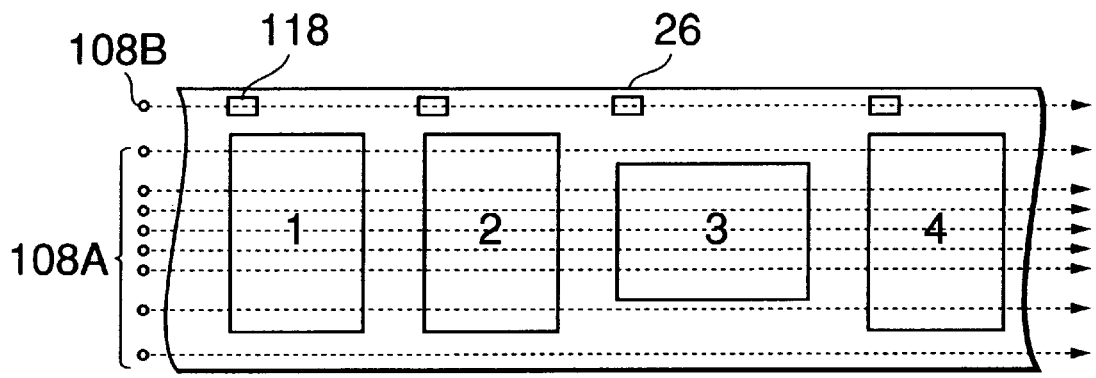
FIGS. 6A to 6C are diagrams explaining the arrangement of optical fibers which serve as density sensors on the microfilm, and shows the tracking loci of the density sensors relative to the microfilm recorded in Simplex system, Duplex system, and Duo system, respectively.

In the embodiment these nine photosensors 108 are positioned along the film width direction in such a manner that a plurality of photosensors 108 constantly pass through one frame even when the film photographing system differs. FIG. 6A shows a case where frames photographed in Simplex system are detected. In this case, the determination section 112 detects frames with eight photosensors 108A based on the output of the sensor selector 114, while blips 122 are detected by another photosensor 108B.

Therefore, the determination section 112 determines the area between frames or the null area 6 using binarized signals outputted from eight binarizing sections 110, and the length of the area is obtained from the counted value N of the counter 118 to detect the presence of the area between frames. For example, when more than half or more than predetermined ratio of determination results indicate the presence of a "between-frames", it is determined that there is an area between frames. The determination may be performed using the logical product or the logical sum of binarized signals. In this case, if the film feeding direction is reversed, the counter 118 is reset as aforementioned. By detecting the presence of the area between frames in this manner, it can be known that there exists one frame just before the area between frames.

The mode of detecting the area between frames forming a white pixel (transparent portion) on the negative film has been described, but the frame forming a black pixel (non-transparent portion) may be detected instead. By counting binarized signals indicative of black pixels, the relevant detected area can be determined to be the frame when the number of consecutive black pixels is equal to or more than the set value. Additionally, when counting the number of black pixels, the blips 122 can be sought using the output of the photosensor 108B (refer to FIG. 6A). This can be applied to a film provided with blips.

Figure 6B:
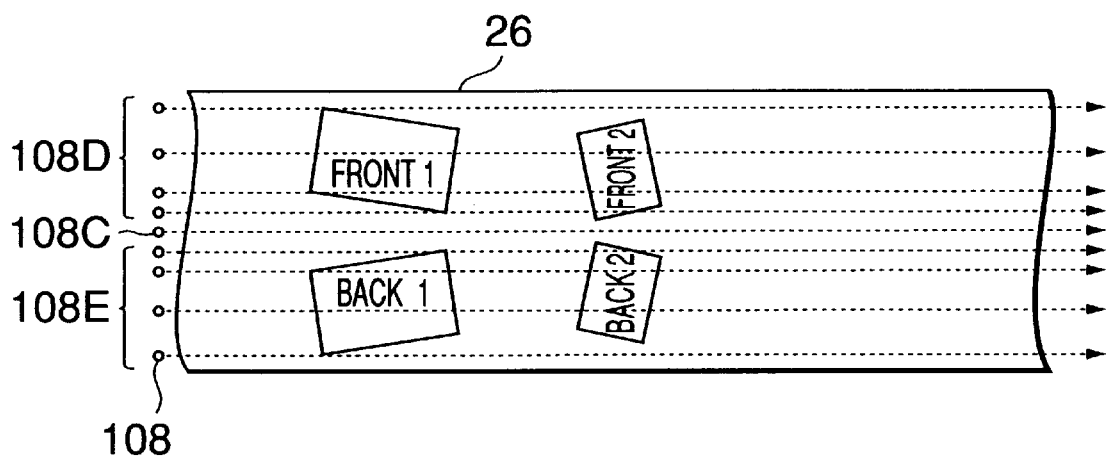

FIG. 6B shows a case of Duplex system, in which front and backside faces of an original document are simultaneously photographed in upper and lower channel of the film. Therefore, a photosensor 108C positioned between both channels detects no frame. In this case, the determination section 112 detects frames in each channel using outputs of three photosensors 108D or 108E extending in the width of the upper or lower channel, except the output of the photosensor 108C.

Figure 6C:
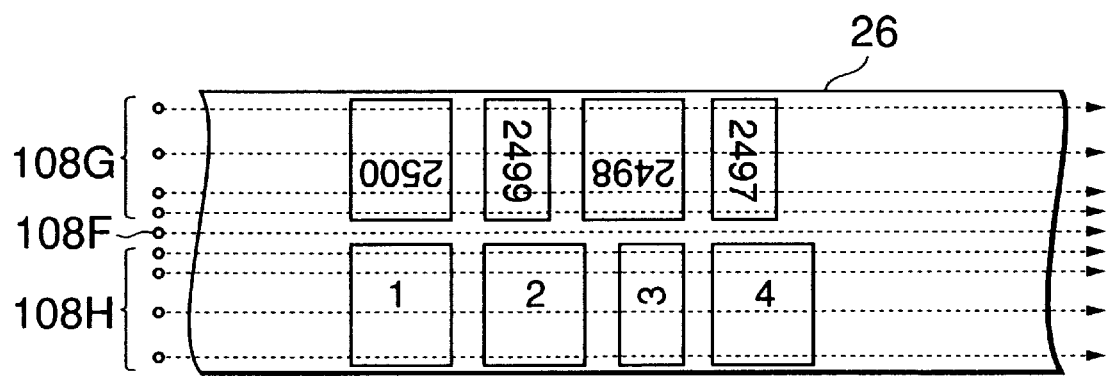

FIG. 6C shows a case of Duo system, in which a center photosensor 108F detects no frame. Therefore, the determination section 112 detects frames of each channel with four photosensors 108G or 108H included in an upper or lower group based on the output of the sensor selector 114. The searching section 116 counts determination signals outputted from the determination section 112 to search for the desired frame In the embodiment, since the optical fibers 104 and 106 are used, the end faces of the optical fibers 104, 106 are used, the film density can be detected at plural positions arranged close to one another in the width direction of a narrow film 26. Moreover, since light is guided to each optical fiber 104 using the light source 52 for image reading, the structure of the light source can advantageously be simplified. However, another light source may be used. Alternatively, light may be guided to each optical fiber 104 using a plurality of light sources. In the invention, however, only a pair of optical fibers may be used.

Furthermore, in the embodiment, since the density sensors (photosensors) are arranged on straight line perpendicular to the film running direction, the presence of frames can be detected at the same time. Therefore, a deviation in output timing of each density sensor (photosensor) does not need to be corrected like in a case where plural arranged density sensors (photosensors) are deviated from the film running direction. A circuit structure is thus simplified.

As aforementioned, in the present invention, the quantity of light transmitted to the optical fibers via the film is detected by the photosensor, and the density signal outputted from the photosensor is binarized to obtain the frame dimension or the dimension between frames. The thus obtained dimension is corrected short when the dimension is detected from the length of a portion where the white signals are continously obtained. Or the dimension is corrected long when the dimension is detected from the length of a portion where the black signals are continously obtained. Therefore, the frame dimension or the dimension between frames can be detected with high accuracy to enhance the frame searching accuracy.

In the present invention, the film feeding amount is monitored by counting the pulse signals outputted from the encoder with the counter, and the counter is reset when the frame is detected and when the film feeding direction is reversed. Additionally, the density change is detected within the frame travel width, the change is binarized in synchronization with the pulse signal of the encoder, and the presence of frames is determined based on the binarized signal. Therefore, even if the film feeding direction is reversed during the scanning of the null area in the frame by the density sensor, the null area is prevented from being incorrectly detected as the area between frames. The presence of frames can correctly be determined. Therefore, the frame detecting accuracy and further the frame searching accuracy are raised.

In this case, when the density sensors are arranged within the travel widths of the frames photographed in different photographing systems, searching can be performed in the films of different photographing systems. The area between frames can be determined when the counted value becomes larger than the threshold counted value corresponding to the distance slightly shorter than the distance between frames.

Moreover, when a plurality of density sensors detect the density of the common frame at the different position in the film width direction to determine the presence of frames based on a plurality of binarized signals, the searching accuracy is further enhanced.

What is claimed is:

1. A microfilm search device for searching a desired frame from a microfilm by detecting the presence of frames from a density change in the running direction of the microfilm, comprising:

a) an encoder for outputting a sampling signal for a predetermined feeding amount of the microfilm;

b) a pair of optical fibers whose end faces are opposed to each other while the microfilm is placed between the end faces within a frame travel width;

c) a light source for guiding light to one of said optical fibers;

d) a photosensor for detecting a quantity of light incident on the other optical fiber to output a density signal;

e) a binarizing section for binarizing the density signal into a white or black signal in synchronization with said sampling signal, the white signal representing a film transparent portion and the black signal representing a film non-transparent portion;

f) a determination section for detecting a frame dimension or a dimension between frames based on the binarized density signal and comparing the dimension with a set value to determine the presence of frames and output a determination signal; and g) a searching section for searching for the desired frame based on said determination signal;

wherein, when the frame dimension or the dimension between frames is detected from the length of a portion where the white signals are continuously obtained, said set value is set longer than an actual frame dimension or an actual dimension between frames; and wherein, when the frame dimension or the dimension between frames is detected from the length of a portion where the black signals are continuously obtained, said set value is set shorter than the actual frame dimension or the actual dimension between frames.

2. A microfilm search device for searching a desired frame from a microfilm by detecting the presence of frames from a density change in the running direction of the microfilm, comprising:
   a) an encoder for outputting a sampling signal for a predetermined feeding amount of the microfilm;
   b) a pair of optical fibers whose end faces are opposed to each other while the microfilm is placed between the end faces within a frame travel width;
   c) a light source for guiding light to one of said optical fibers;
   d) a photosensor for detecting a quantity of light incident on the other optical fiber to output a density signal;
   e) a binarizing section for binarizing the density signal into a white or black signal in synchronization with said sampling signal, the white signal representing a film transparent portion and the black signal representing a film non-transparent portion;
   f) a determination section for detecting a frame dimension or a dimension between frames based on the binarized density signal and comparing the dimension with a set value to determine the presence of frames and output a determination signal; and
   g) a searching section for searching for the desired frame based on said determination signal;
   wherein said determination section corrects the dimension to shorten the frame dimension or the dimension between frames obtained from the binarized density signal, when detecting the frame dimension or the dimension between frames from the length of a portion where the white signals are continuously obtained;
   wherein said determination section corrects the dimension to lengthen the dimension when detecting the dimension from the length of a portion where the black signals are continuously obtained; and
   wherein said determination section compares the corrected dimension with said set value to determine the presence of frames.

3. A frame/between-frames dimension detecting method for use in a microfilm search device for detecting the presence of frames from a density change in the running direction of a microfilm, comprising the steps of:
   guiding light to one of a pair of optical fibers whose end faces are opposed to each other with the microfilm placed therebetween;
   detecting the quantity of light incident upon the other optical fiber with a photosensor to obtain a density signal;
   binarizing the density signal into a white or black signal in synchronization with a predetermined feeding amount of the microfilm;
   obtaining a dimension of a frame or an interspace between frames based on the binarized density signal;
   correcting the dimension to shorten, when the dimension is detected from the length of a portion where the white signals are continuously obtained; and
   correcting the dimension to lengthen, when the dimension is detected from the length of a portion where the black signals are continuously obtained.

4. A microfilm search device for searching a desired frame from a microfilm by detecting the presence of frames from a density change in the running direction of the microfilm, comprising:
   a) an encoder for outputting a pulse signal for a predetermined feeding amount of the microfilm;
   b) a density sensor for detecting the film density of the microfilm along the running direction of the microfilm to output a density signal;
   c) a binarizing section for binarizing the density signal into a white or black signal in synchronization with said pulse signal, the white signal representing a film transparent portion and the black signal representing a film non-transparent portion;
   d) a counter for counting said pulse signal to obtain a film travel amount, said counter being reset at the time of frame detection and at the time of film reversing;
   e) a reverse detector for detecting a change of the film running direction to reset said counter;
   f) a determination section for counting the number of either one of the binarized signals based on said counter to determine the presence of frames and output a determination signal; and
   g) a searching section for searching for the desired frame based on said determination signal.

5. The device according to claim 4, wherein plural density sensors are arranged within travel widths of frames photographed in different photographing systems.

6. The device according to claim 4, wherein said counter counts the binarized signal indicative of the outside of the frame, and said determination section determines that the detected area is an area between frames when the counted value of the counter is larger than a threshold value corresponding to the distance slightly smaller than the actual distance between the frames.

7. The search device according to claim 4, wherein plural density sensors are provided for detecting film densities in plural positions for the common frame, and the determination section uses the binarized signals based on outputs of the plural density sensors to determine the presence of frames.

* * * * *